(12) United States Patent
Schwindt

(10) Patent No.: US 10,748,433 B2
(45) Date of Patent: Aug. 18, 2020

(54) SYSTEMS AND METHODS FOR AUTONOMOUS DISTRESS TRACKING IN AERIAL VEHICLES

(71) Applicant: GE Aviation Systems LLC, Grand Rapids, MI (US)

(72) Inventor: Stefan Alexander Schwindt, Cheltenham (GB)

(73) Assignee: GE Aviation Systems LLC, Grand Rapids, MI (US)

(*) Notice: Subject to any disclaimer, the term of this patent is extended or adjusted under 35 U.S.C. 154(b) by 0 days.

(21) Appl. No.: 15/862,960

(22) Filed: Jan. 5, 2018

(65) Prior Publication Data

US 2019/0213892 A1     Jul. 11, 2019

(51) Int. Cl.

| G08G 5/00 | (2006.01) |
| H04W 4/12 | (2009.01) |
| G08B 25/00 | (2006.01) |
| H04W 4/42 | (2018.01) |
| B64D 45/00 | (2006.01) |
| H04W 52/02 | (2009.01) |

(52) U.S. Cl.
CPC .......... *G08G 5/0056* (2013.01); *B64D 45/00* (2013.01); *G08B 25/00* (2013.01); *G08G 5/0004* (2013.01); *G08G 5/0013* (2013.01); *G08G 5/0021* (2013.01); *G08G 5/0039* (2013.01); *H04W 4/12* (2013.01); *H04W 4/42* (2018.02); *H04W 52/0251* (2013.01); *B64D 2045/0065* (2013.01)

(58) Field of Classification Search
USPC .......................................................... 701/3
See application file for complete search history.

(56) References Cited

U.S. PATENT DOCUMENTS

| 6,799,094 B1 | 9/2004 | Vaida et al. |
| 7,379,795 B2 | 5/2008 | Arnouse |

(Continued)

FOREIGN PATENT DOCUMENTS

| CN | 104751601 A | 7/2015 |
| GB | 2534678 A | 8/2016 |

(Continued)

OTHER PUBLICATIONS

European Patent Application No. 1709709.8 filed Jun. 19, 2017.

(Continued)

*Primary Examiner* — Tyler D Paige
(74) *Attorney, Agent, or Firm* — Dority & Manning, P.A.

(57) ABSTRACT

Systems and methods for autonomous distress tracking (ADT) of aerial vehicles are provided. An autonomous distress tracking (ADT) system for an aerial vehicle is provided that includes one or more ADT devices. Each device includes at least one transmitter configured to transmit messages over one or more predetermined frequency bands. And ADT control system is configured to control a transmission rate of the one or more ADT devices based on flight plan data associated with an on-going flight of the aerial vehicle and performance data associated with the aerial vehicle during the on-going flight. The ADT control system can compare the flight plan data with the performance data to determine one or more deviations associated with the flight plan data and control a transmission rate of the one or more ADT devices based on the deviations.

20 Claims, 10 Drawing Sheets

(56) References Cited

U.S. PATENT DOCUMENTS

| | | |
|---|---|---|
| 7,406,368 B2 | 7/2008 | Arnouse |
| 7,855,654 B2 | 12/2010 | Katz |
| 7,948,401 B2 * | 5/2011 | Wartofsky ............ G08B 29/185 |
| | | 340/945 |
| 8,687,375 B2 | 4/2014 | Uy et al. |
| 8,727,263 B2 | 5/2014 | Fabre et al. |
| 8,766,820 B2 | 7/2014 | Santiago Fontaina |
| 9,403,602 B1 | 8/2016 | Heinrich et al. |
| 9,602,187 B2 | 3/2017 | Jacobs et al. |
| 2002/0173888 A1 * | 11/2002 | Shelton ................ G08G 5/0082 |
| | | 701/33.4 |
| 2004/0225474 A1 * | 11/2004 | Goldfine ............ G01N 27/9046 |
| | | 702/183 |
| 2010/0271198 A1 * | 10/2010 | Boling .................. B60R 25/102 |
| | | 340/539.1 |
| 2011/0122019 A1 | 5/2011 | Lee et al. |
| 2012/0007750 A1 | 1/2012 | Gorabi et al. |
| 2015/0134154 A1 | 5/2015 | Colin |
| 2016/0047880 A1 * | 2/2016 | Helfrick ................ G01S 5/0231 |
| | | 340/981 |
| 2016/0318622 A1 | 11/2016 | Haukom |
| 2017/0063944 A1 | 3/2017 | Nyikos et al. |
| 2017/0082455 A1 | 3/2017 | Adler et al. |
| 2017/0106997 A1 * | 4/2017 | Bekanich ............. G08B 25/006 |
| 2017/0248676 A1 | 8/2017 | Murphy et al. |
| 2017/0248701 A1 | 8/2017 | Adler et al. |

FOREIGN PATENT DOCUMENTS

| | | |
|---|---|---|
| KR | 20070117518 A | 12/2007 |
| KR | 20130059162 A | 6/2013 |

OTHER PUBLICATIONS

Hof, Global Aeronautical Distress and Safety System (GADSS), ICAO GADSS Advisory Group, Version 6.0, Jul. 6, 2017, 52 pages.

Pichavant, Aircraft Tracking and Flight Data Recovery, The Aircraft Manufacturer View, Apr. 2016, 32 pages.

Translated French Written Opinion Corresponding to Application No. 1879326 dated Dec. 10, 2019.

Canadian Office Action Corresponding to Appllication No. 3028072 dated Dec. 17, 2019.

* cited by examiner

SYSTEMS AND METHODS FOR AUTONOMOUS DISTRESS TRACKING IN AERIAL VEHICLES

FIELD

The present disclosure relates generally to aerial vehicles.

BACKGROUND

An aerial vehicle can rely on one or more engines such as jet turbine engines, turbofan engines, and turbojet engines to control the aerial vehicle. To aid in search and recovery associated with aircraft, an aerial vehicle can include one or more emergency locator transmitters (ELTs). An ELT can transmit signals over a predetermined frequency band(s) so that a search and rescue team can locate the aerial vehicle based on signals transmitted from the aerial vehicle. While ELT's are often effective, they consume power such that their transmissions are often controlled and/or limited. For example, it is common for ELT's to be activated only in the event of catastrophic failure so as to maximize the amount of time for transmitting emergency signals.

BRIEF DESCRIPTION

Aspects and advantages of the disclosed technology will be set forth in part in the following description, or may be obvious from the description, or may be learned through practice of the disclosure.

According to example aspects of the present disclosure, there is provided an aerial vehicle, comprising one or more autonomous distress tracking (ADT) devices that each include at least one transmitter configured to transmit messages over one or more predetermined frequency bands. The aerial vehicle includes a control system configured to control a transmission rate of the one or more ADT devices. The control system is configured to obtain flight plan data associated with an ongoing flight of the aerial vehicle, determine performance data associated with the aerial vehicle during the ongoing flight, compare the flight plan data with the performance data to determine one or more deviations associated with the aerial vehicle, and control the transmission rate of the one or more ADT devices based on the one or more deviations.

According to example aspects of the present disclosure, there is provided an autonomous distress tracking (ADT) system, comprising a first transmitter configured to transmit messages over one or more predetermined frequency bands, and at least one processor configured to control transmissions by the first transmitter. The at least one processor is configured to obtain flight plan data associated with an ongoing flight of an aerial vehicle, determine performance data associated with the aerial vehicle during the ongoing flight, determine a state of the aerial vehicle based on a comparison of the flight plan data with the performance data, transmit messages via the first transmitter at a first interval in response to a first state of the aerial vehicle, and transmit messages via the first transmitter at a second interval in response to a second state of the aerial vehicle. The first interval is longer than the second interval.

According to example aspects of the present disclosure, there is provided a computer-implemented method, comprising transmitting data via at least one transmitter of a tracking device for an aerial vehicle at a first transmission rate, obtaining flight plan data associated with an ongoing flight of the aerial vehicle, determining performance data associated with the aerial vehicle during the ongoing flight, detecting one or more deviations based on comparing the flight plan data with the performance data, and transmitting data via the at least one transmitter at a second transmission rate in response to detecting the one or more deviations. The first transmission rate is slower than the second transmission rate.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
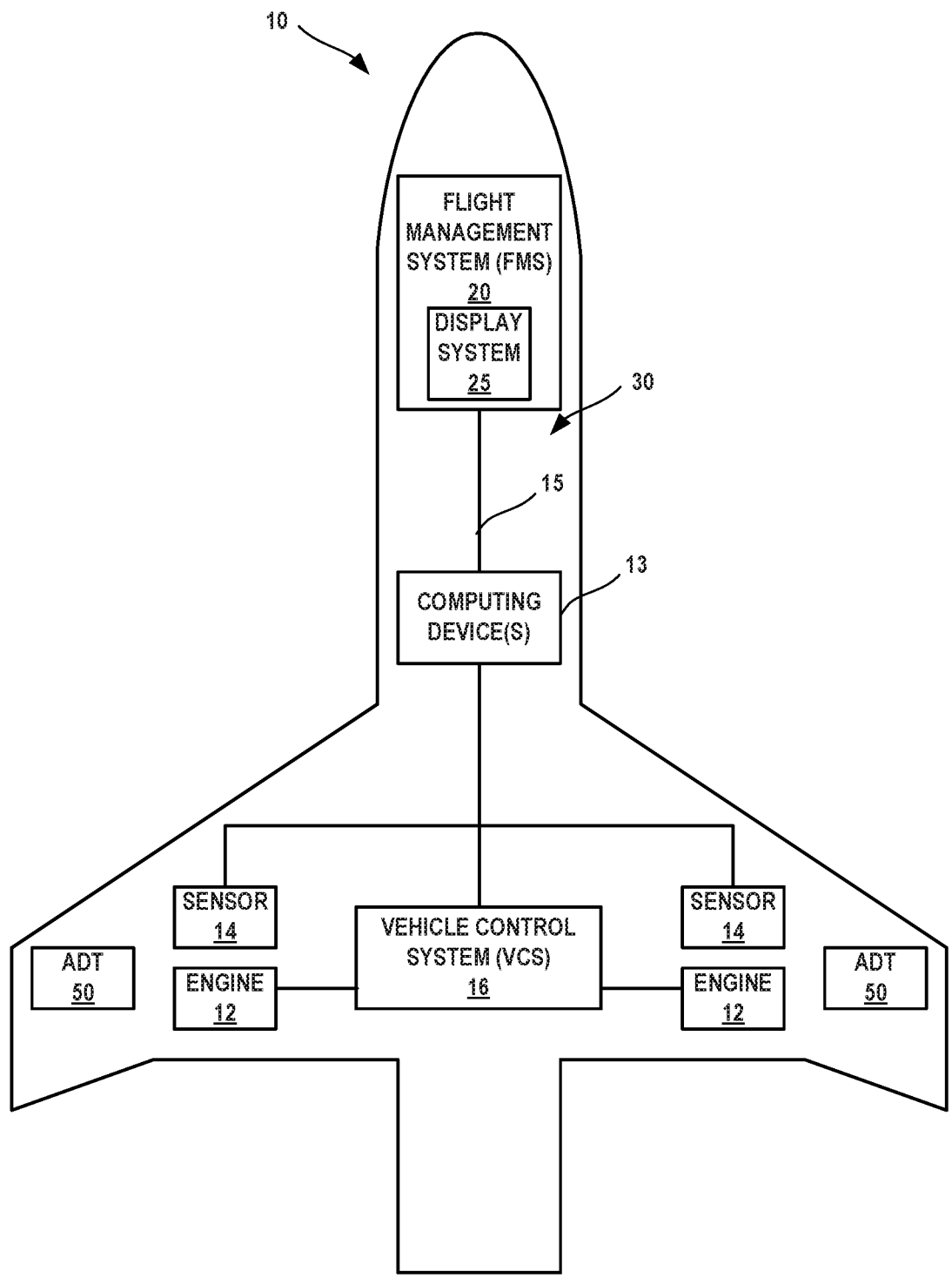
FIG. 1 is a block diagram depicting an example of an aerial vehicle in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems and methods for autonomous distress tracking (ADT) for aerial vehicles, and more particularly, to systems and methods for controlling the transmission rate of autonomous distress tracking devices in aerial vehicles. In accordance with example embodiments of the disclosed technology, flight plan data associated with an ongoing flight of an aerial vehicle is obtained. Additionally, performance data related to the aerial vehicle during the ongoing flight is obtained. The performance data is compared with the flight plan data in order to detect one or more deviations of the aerial vehicle from a flight plan. A transmission rate of an autonomous distress tracking (ADT) device can be controlled based on the one or more deviations.

According to example embodiments of the disclosed technology, an autonomous distress tracking (ADT) system is provided that includes at least one transmitter configured to transmit messages over one or more predetermined frequency bands. The ADT system includes an ADT control system that is configured to control the transmission rate of the at least one transmitter based on flight plan data and performance data associated with an aerial vehicle. For example, the ADT control system can be configured to determine an operational state of the aerial vehicle based on deviations between flight plan data and performance data. Based on the current operational state of the aerial vehicle, the ADT control system can control the transmission rate of the at least one transmitter.

In some examples, the at least one transmitter includes a first transmitter configured to transmit messages over a first predetermined frequency band and a second transmitter configured to transmit messages over a second predetermined frequency band. The ADT control system can be configured to transmit messages at a first communication interval via the first transmitter in response to a normal operational state of the aerial vehicle. The ADT control system can be configured to transmit messages at a second communication interval via the first transmitter in response to an abnormal operational state. The ADT control system can be configured to transmit messages at the second communication interval via the first transmitter in response to a distress operational state of the aerial vehicle. Additionally, the ADT control system can selectively active a second transmitter based on the distress operational state. For example, the ADT control system can transmit messages at a third communication interval via the second transmitter in response to the distress operational state. The first communication interval is longer than the second communication interval, and the second communication interval is longer than the third communication interval in some examples.

According to example embodiments, the system may use one or more threshold criterion to determine whether a detected deviation is actionable. For example, the system may determine whether a deviation between a current flight path and a planned trajectory satisfies a first threshold distance or other measure. If the deviation meets or exceeds the threshold distance, for example, the system may determine that the detected deviation corresponds to an abnormal operational state of the aerial vehicle. In response, the system may increase the transmission rate of the ADT device. If the deviation meets or exceeds a second threshold distance, the system may determine that the detected deviation corresponds to a distress operational state.

In some implementations, the ADT control system may generate warnings and/or a user interface to provide updated flight plan data and/or to receive pilot confirmation of operating conditions or other information. For example, the ADT control system may provide a warning and request for pilot confirmation in response to detecting an actionable deviation from the flight plan data. Various notification signals including display and/or other notifications may be used. If a pilot confirmation of normal operation is received, the system may determine that the aerial vehicle is in the normal operational state. If a pilot confirmation of an abnormal condition is received, or if no pilot confirmation is received, the system may determine that the aerial vehicle is in an abnormal operational state.

In accordance with some embodiments of the disclosed technology, the ADT control system may compare deviations from flight plan data with one or more standard operating procedures. For example, the ADT control system may determine whether a deviation and/or performance data are consistent with a standard operating procedure. If the deviation is consistent with the standard operating procedure, the ADT control system may generate updated flight plan data for the pilot or other vehicle operator. The updated flight plan data may be generated based on the type of detected deviation. In this manner, the system may remove pilot workload during abnormal or distress operating conditions.

Embodiments of the disclosed technology provide a number of technical benefits and advantages, particularly in the area of aerial vehicles. As one example, the techniques described herein enable an aerial vehicle to automatically control the transmission rate of onboard distress tracking devices. More particularly, aerial vehicle performance and flight plan data can be compared to automatically detect deviations from an intended flight plan. In response to these detected deviations, the aerial vehicle can automatically increase its signal transmission rate in order to more efficiently and accurately locate the aerial vehicle. The utilization of performance data and flight plan data may provide for efficient use of limited aircraft resources such as power for enabling the ADT device.

Embodiments of the disclosed technology additionally provide a number of technical benefits and advantages in the area of computing technology. For example, the disclosed system can obtain performance data and flight plan data to efficiently assess an aerial vehicle operational state. More particularly, a computing system in accordance with the disclosed technology can efficiently control the transmission rate of a tracking device based on the determined operational state. Additionally, a computing system may obtain standard procedures to determine whether detected deviations are consistent with known operating procedures. In response to a detected consistency, a computing device can automatically generate updated flight plan information.

FIG. 1 depicts a block diagram of an example aerial vehicle 10 according to example embodiments of the present disclosure. The aerial vehicle 10 can include one or more engines 12 that can cause operations, such as propulsion of and/or on-board power generation for the aerial vehicle 10. An engine 12 can be a gas turbine engine such as a jet turbine engine, turboprop engine, turbofan engine, a turbo shaft engine, or any other suitable engine, including piston engine propellers, electrically-driven fans or propellers, or any hybrid of the above.

The aerial vehicle 10 can include an onboard computing system 30 including one or more onboard computing devices 13 that can be associated with, for example, an avionics system. The one or more onboard computing devices 13 can be coupled to a variety of systems on the aerial vehicle 10 over one or more communication networks, including for example, one or more data buses and/or combinations of wired and/or wireless communication links. In example embodiments, the onboard computing system 30 may include or implement a flight management system (FMS) 20 and a vehicle control system (VCS) 16 as shown in FIG. 1. It will be appreciated that an FMS 20 and VCS 16 are broadly depicted by way of example only in FIG. 1 to represent the many varied control systems that may be implemented by onboard computing devices of the aerial vehicle.

The flight management system 20 may include a flight control system in some implementations. In other implementations, the flight control system may be separate from the flight management system 20. In example embodiments, the flight control system can control or automate the tasks of piloting and the flight management system can control or automate the tasks of navigation and guidance according to the flight plan of the aerial vehicle 10. The flight control system can include or be associated with, any suitable number of individual microprocessors, power supplies, storage devices, interface cards, auto flight systems, flight management computers, and other standard components. The flight control system can include or cooperate with any number of software programs (e.g., flight management programs) or instructions designed to carry out the various methods, process tasks, calculations, and control/display functions necessary for operation of the aerial vehicle 10. The flight control system may be separate from the onboard computing device(s) 13, or can be included with or implemented by the onboard computing device(s).

The aerial vehicle control system(s) 16 can be configured to perform various aerial vehicle operations and control various settings and parameters associated with the aerial vehicle 10. For instance, the aerial vehicle control system(s) 16 can be associated with the one or more engine(s) 12 and/or other components of the aerial vehicle 10. The aerial vehicle control system(s) 16 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system, a landing system, and other systems.

In some implementations, the vehicle control system 16 includes one or more engine controllers. For example, vehicle control system 16 may include an electronic engine controller (EEC) for each engine 12 in some embodiments. In other examples, vehicle control system 16 may include a Full Authority Digital Engine Control (FADEC) system. A FADEC system is often used for aerial vehicles having two or more engines because the FADEC system dynamically controls the operation of each gas turbine engine and requires minimal, if any, supervision from the pilot. The vehicle control system may include other control systems such as a fuel control system including one or more fuel controllers configured to control fuel flow for the one or more engines 12.

The aerial vehicle 10 can additionally include one or more sensors 14. The one or more sensors 14 can be used to detect one or more parameters related to the engine(s) 12, aerial vehicle 10, and/or atmosphere external to the aerial vehicle. The one or more sensors 14 can communicate the one or more detected parameters to the flight management system (FMS) 20 and/or vehicle control system (VCS) 16. In some implementations, the one or more sensors and/or FMS 20 and/or VCS 16 can communicate parameters to one or more external components. In some implementations, the avionics system can include or be in communication with a location system, for example. The location system can include a global positioning system (GPS), inertial reference systems, and the like.

FMS 20 and/or VCS 16 may determine aircraft performance data from the sensor data received the one or more sensors 14. In some examples, the performance data is derived from the aircraft sensor data. For example, multiple location coordinates may be analyzed in order to determine a projected trajectory of the aerial vehicle. In other examples, the performance data may include the aircraft sensor data directly. For example, one or more of the aircraft sensors may directly provide a measure of aerial vehicle speed.

The onboard computing device(s) can be coupled to a variety of systems on the aerial vehicle 10 over a communications network 15. The communications network 15 can include a data bus or combination of wired and/or wireless communication links. The aerial vehicle can include a datalink protocol for communicating over satellite, very high frequency (VHF) radio, and/or high frequency (HF) radio, such as an aircraft communications addressing and reporting system (ACARS).

The flight management system 20 may include a display system 25 including one or more display device(s), such as the flight displays in a cockpit of the aerial vehicle 10. The display system may be configured to display or otherwise provide information generated or received by the system 30. In example embodiments, information generated or received by the onboard computing system can be displayed on the one or more display device(s) for viewing by flight crew members of the aerial vehicle 10. The display system can include a primary flight display, a multipurpose control display unit, or other suitable flight displays commonly included within the cockpit of the aerial vehicle 10.

The aerial vehicle can include one or more autonomous distress tracking (ADT) devices 50. The one or more ADT devices 50 can be located in one or more designated fire zones of the aerial vehicle 10 in some implementations. For example, the one or more ADT devices 50 can be located in one or more nacelles of the aerial vehicle 10. In another example, the one or more ADT devices 50 can be located on the one or more engine(s) 20 of the aerial vehicle 10. In yet another example, the one or more ADT devices 50 can be located in one or more fairings of the aerial vehicle 10.

ADT devices 50 may transmit data such as messages carrying information about the aerial vehicle during an ongoing flight. Generally, the ADT devices enable the aerial vehicle to be localized to a defined maximum search radius, such as may be prescribed by various regulatory and/or standard-setting bodies. For example, the ADT devices may transmit signals regularly during an ongoing flight in order to provide tracking capability for the aerial vehicle. Additionally, ADT devices 50 are configured to control the transmission rate of signals based on the aerial vehicle performance. For example, ADT devices 50 can be configured to detect an abnormal operational state and in response, increase the transmission rate of signals. In some examples, ADT devices 50 may include two or more transmitters. ADT devices 50 may transmit signals using a first transmitter when the aerial vehicle is in a normal or abnormal operational state. ADT devices 50 can further be configured to detect a distress operational state and in response, activate the second transmitter. In some examples, the second transmitter transmits messages at a higher frequency than the first transmitter. According to example embodiments, ADT devices can extend the transmission time of traditional ELT devices, as well as increase the probability of location of an aerial vehicle by early activation of the ADT device, which may aid in the event a portion of the ADT device such as an antenna is disabled as the result of a catastrophic event.

The onboard computing device(s) 13, including vehicle control system 16 and flight management system 20, may generally include one or more processor(s) and associated memory configured to perform a variety of computer-implemented functions, such as various methods, steps, calculations and the like disclosed herein. In some examples, control systems such as an engine control system and/or fuel control system may be programmable logic devices, such as a Field Programmable Gate Array (FPGA), however they may be implemented using any suitable hardware and/or software.

The term processor may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the flight management system and vehicle control system may also include a communications interface. The communications interface can include associated electronic circuitry that is used to send and receive data. More specifically, the communications interface can be used to send and receive data between any of the various control systems. Similarly, a communications interface at any one of the controllers may be used to communicate with outside components such as another aerial vehicle and/or ground control. A communications interface may be any combination of suitable wired or wireless communications interfaces.

The numbers, locations, and/or orientations of the components of example aerial vehicle 10 are provided for purposes of illustration and discussion and are not intended to be limiting. Those of ordinary skill in the art, using the disclosures provided herein, shall understand that the numbers, locations, and/or orientations of the components of the aerial vehicle 10 can be adjusted without deviating from the scope of the present disclosure.

Figure 2A:
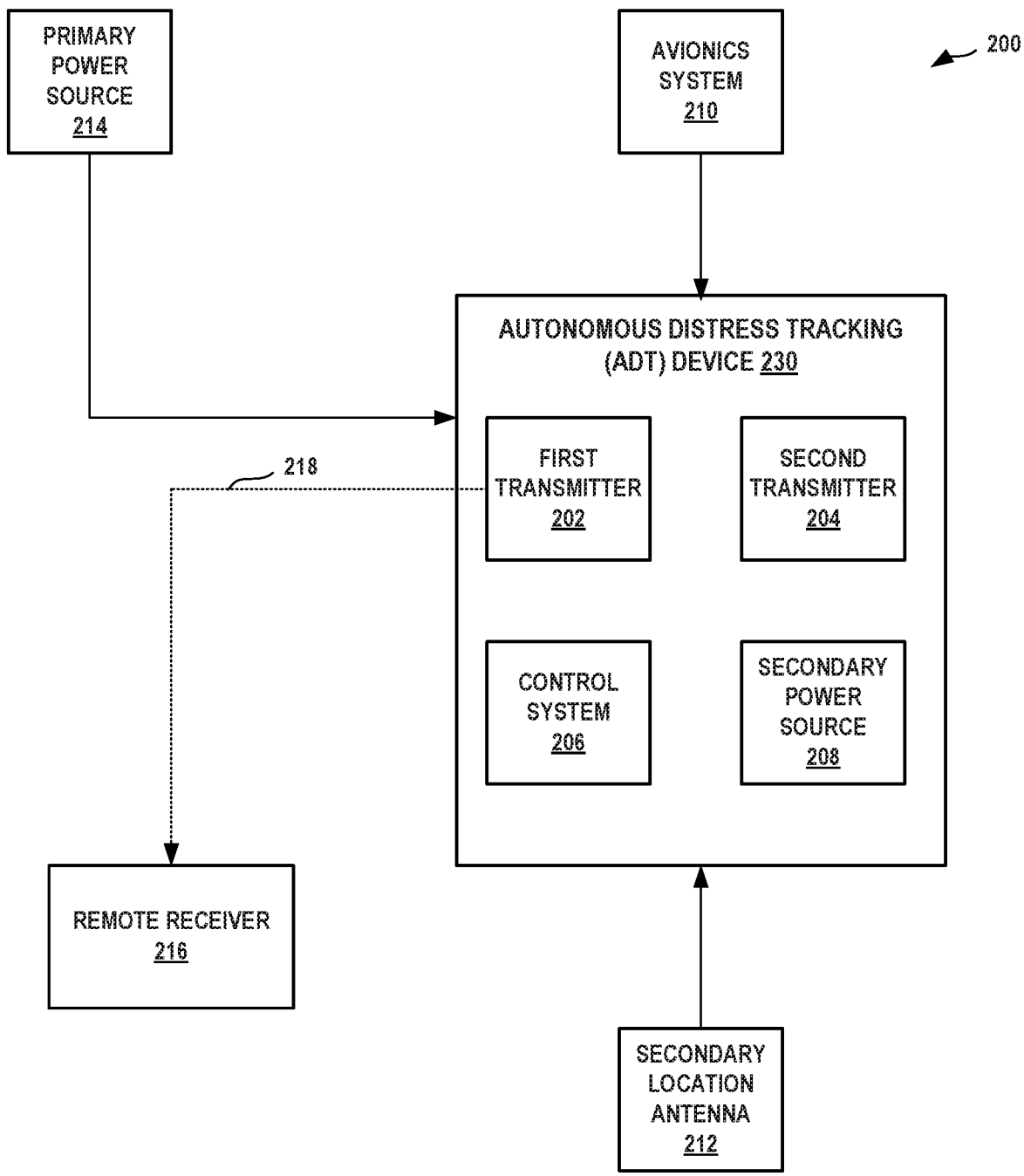
FIG. 2A is a block diagram depicting an autonomous distress tracking (ADT) device according to example embodiments of the present disclosure.
Figure 2B:
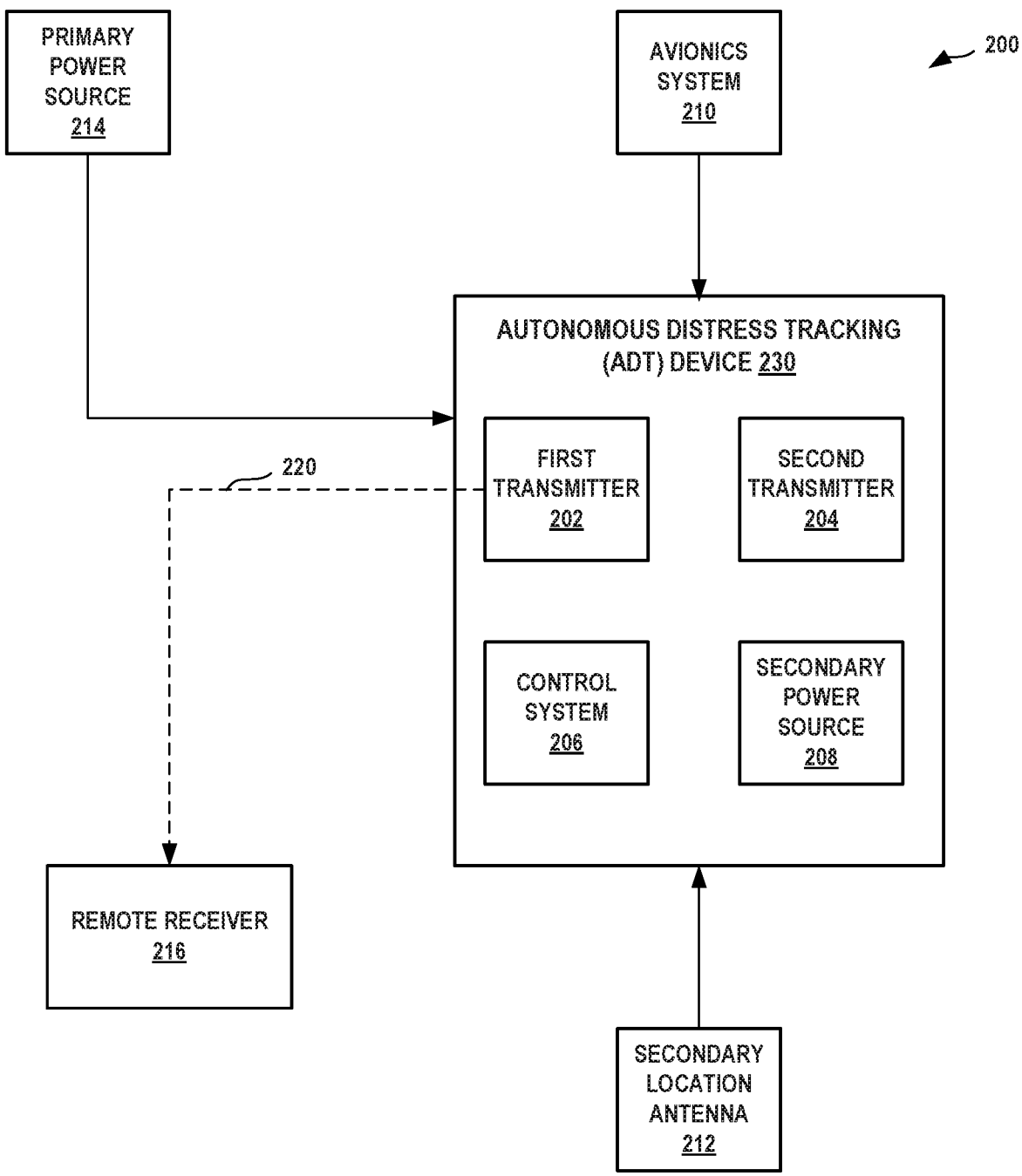
FIG. 2B is a block diagram depicting an ADT device according to example embodiments of the present disclosure.
Figure 2C:
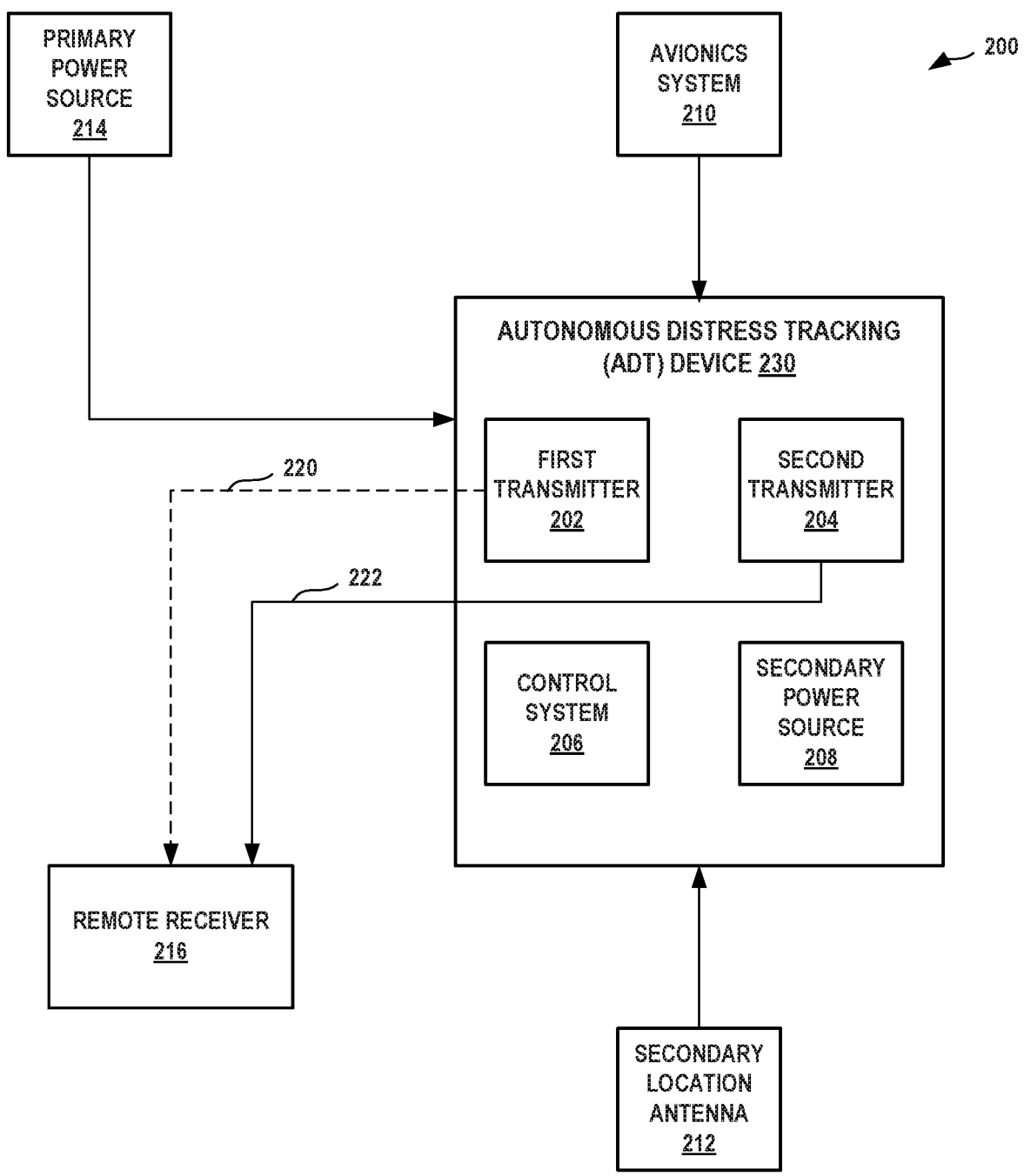
FIG. 2C is a block diagram depicting an ADT device according to example embodiments of the present disclosure.

FIGS. 2A-2C are block diagrams depicting an autonomous distress tracking (ADT) system 200 according to example embodiments of the present disclosure. ADT system 200 includes an autonomous distress tracking (ADT) device 230. The ADT device 230 can draw power from a primary power source 214. The primary power source 214 can be in communication with a gearbox of an engine and/or an electrical generator connected to and/or integrated with the gearbox. The primary power source 214 can also provide power to a full authority digital engine control (FADEC). The ADT device 230 can include a secondary power source 208. The secondary power source 208 can power the ADT device 230 when the ADT device 230 is unable to draw power from the primary power source 214. The secondary power source 208 can include a battery, fuel cell, or other suitable power source.

The ADT device 230 can include a first transmitter 202. The first transmitter 202 can be configured to transmit messages over at least a first frequency band. The first frequency band may be a frequency band used for traditional or normal radio communications. For example, the frequency band may be a frequency band used for non-emergency communications between aerial vehicles, between aerial vehicles and ground stations, and/or between ground stations. The first transmitter 202 can transmit data over the frequency band used for normal communications. The data transmitted over the first frequency band used for normal communications can include: a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the distress signal), etc.

The ADT device 230 can include a second transmitter 204. The second transmitter 204 can transmit data over at least a second frequency band. The second frequency band may be a frequency band reserved for emergency communications. The data transmitted over the second frequency band can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc.

The ADT device 230 can include an ADT control system 206. ADT control system 206 can control the transmission rate of the first transmitter 202 and the second transmitter 204. In various examples, the ADT control system may analyze flight plan data and aircraft performance data in order to determine transmission rates, including transmission intervals, for the ADT device. The ADT device 230 and/or the control system 206 can be in communication with an avionic system 210. Although FIGS. 2A-2C describe an ADT control system incorporated within the ADT device 230, this is not required. For example, an ADT control system may be implemented externally to the ADT device.

In some examples, the ADT device 230 and/or the control system 206 can receive a first set of location coordinates from the avionic system 210. The first set of location coordinates can include global positioning system (GPS) coordinates received from a GPS sensor, for example. In an embodiment, the ADT device 230 can communicate with other ADT devices via the avionic system 210. In another embodiment, the ADT device 230 can communicate with other ADT devices via a wired or wireless communication interface of the control system 206.

The ADT device 230 can be in communication with a secondary location antenna 212. The secondary location antenna 212 can include, for example, a GPS antenna. The ADT device 230 and/or the control system 206 can get the first set of location coordinates from a primary location system, such as through the avionic system 210. The ADT device 230 and/or the control system 206 can receive a second set of location coordinates from a secondary location antenna 212. The second set of location coordinates can include GPS coordinates.

The ADT device 230 and/or the control system 206 can determine a state of the aerial vehicle. For example, the ADT device 230 and/or the control system 206 can determine the state of the aerial vehicle based on an ability to draw power (for example, if the ADT device 230 and/or the control system 206 draws power from an engine and it can no longer draw power, then the engine may be out), a comparison of the first set of location coordinates and the second set of location coordinates, a signal from the avionic system, etc. The ADT device 230 can transmit one or more messages such as beacons based on the determined state of the aerial vehicle. A remote receiver 216, such as a receiver on a search and rescue vehicle, can receive the one or more beacons.

ADT control system 206 may be implemented as hardware, software, or as a combination of hardware and software. The software may be stored as processor readable code and implemented in a processor, as processor readable code for programming a processor for example. In some implementations, one or more of the components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each unit, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor for ADT control system 206 to perform the functions described herein. The architecture depicted in FIGS. 2A-2C is one example implementation. These various computing-based elements may be configured at a single computing device, or may be distributed across multiple computing devices.

FIG. 2A depicts the ADT system 200 of an aerial vehicle in a first operational state. In this example, the first operational state corresponds to a normal operational state. The normal operational state in one example refers to a state including safe operating parameters, such as a set of known inputs to the aerial vehicle generating a set of expected outputs, each of which may be measured by one or more sensors of the aerial vehicle. When an aerial vehicle is determined to be in a normal operational state, the ADT device 230 can transmit a first message 218 such as a beacon from the first transmitter 202 at a first interval. Transmitting messages at a first interval may include using a first transmission rate for the first transmitter. The first message 218 can include first data. In one example, the first data can include: a unique identifier associated with the aerial vehicle, location information (such as location coordinates), error/anti-hacking measures (such as hashes and/or cyclic redundancy check (CRC) information), flight information (such as altitude, direction, speed), etc. In various embodiments, the first interval may be a relatively long transmission interval, resulting in a slow transmission rate. For example, the first interval can be fifteen minutes, but any interval can be used. In this manner, the first data may be transmitted rather infrequently when the aerial vehicle is in a normal operational state.

FIG. 2B depicts the ADT system 200 of the aerial vehicle in a second operational state. In this example, the second operational state corresponds to an abnormal operational state. The abnormal operational state in one example refers to a state including one or more abnormal operating parameters, such as at least one unexpected input or output. In another example, the abnormal operational state may refer to a possible distress state.

When the aerial vehicle is determined to be in an abnormal state, the ADT device 230 can transmit a second message 220 such as a beacon from the first transmitter 202 at a second interval. Transmitting messages at a second interval may include using a second transmission rate for the first transmitter. The second message 220 can include second data. In one example, the second data can include: a unique identifier associated with the aerial vehicle, a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the possible distress signal), etc. Generally, the second interval is shorter than the first interval such that the second transmission rate is faster than the first transmission rate. The second interval can be, for example, one minute, but any interval can be used. The second data may be transmitted more frequently when the aerial vehicle is in an abnormal operational state.

FIG. 2C depicts the ADT system 200 of the aerial vehicle in a third operational state. In this example, the third operational state corresponds to a distress state. The distress state in one example refers to a state including one or more operating parameters indicating a distressed condition of the aerial vehicle. By way of example, a distressed condition may refer to a loss of engine or aircraft control. When the aerial vehicle is determined to be in a distress state, the ADT device 230 can transmit the second message 220 from the first transmitter 202 at the second interval and a third message 222 at a third interval from the second transmitter 204. Transmitting messages at a third interval may include using a third transmission rate for the second transmitter. The third message 222 can include third data. In one example, the third data can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc. Generally, the third interval is shorter than the second interval such that the third transmission rate is faster than the second transmission rate. The third transmission rate may be a continuous transmission rate in some examples. The third data may be transmitted more frequently than the first data or second data when the aerial vehicle is in a distress operational state.

Figure 3:
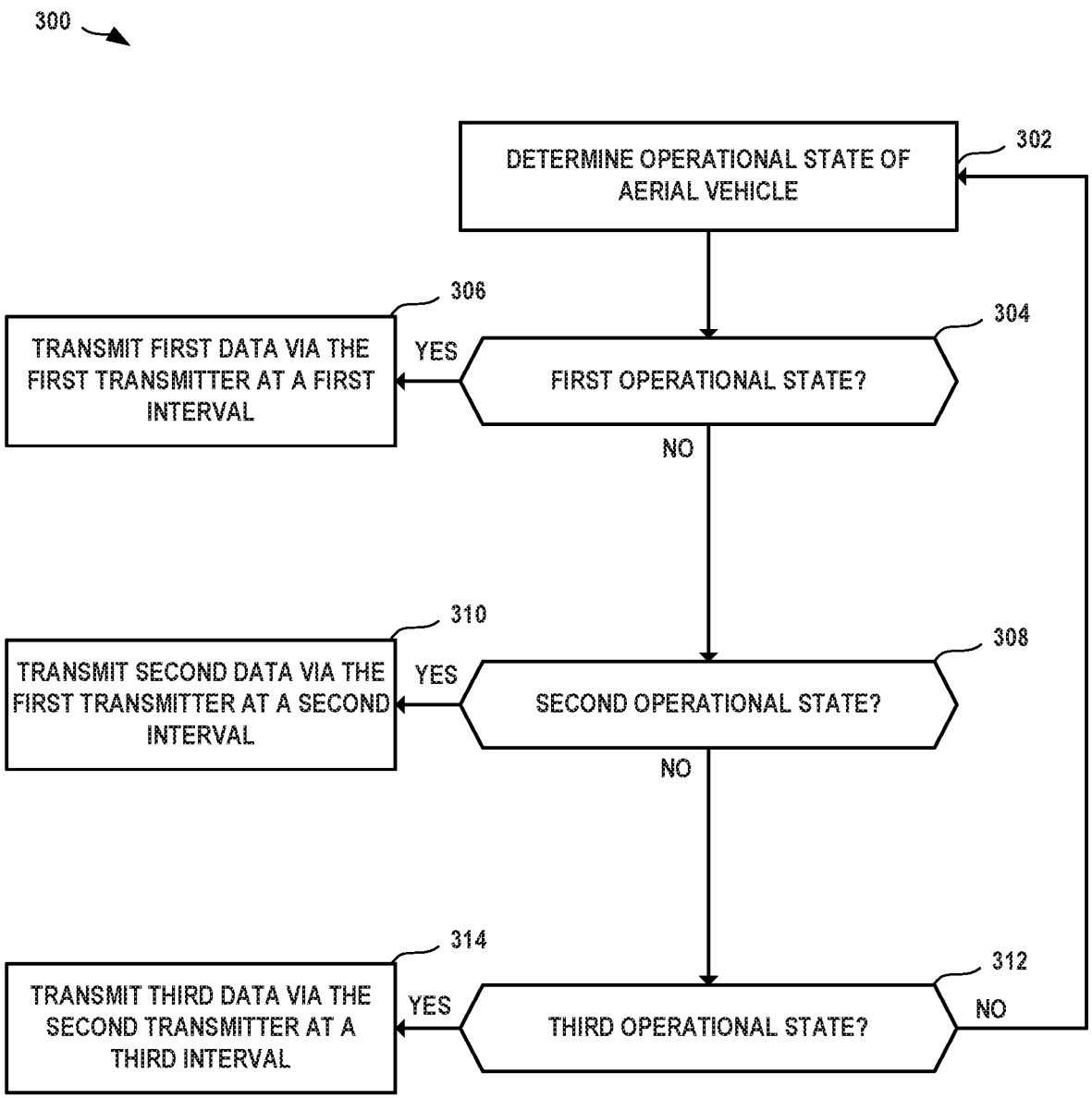
FIG. 3 is a flowchart describing a process of transmitting data using an ADT device according to example embodiments of the present disclosure.

FIG. 3 is flowchart describing an example process 300 of controlling transmissions by an autonomous distress tracking (ADT) system in accordance with the disclosed technology. In some implementations, process 300 can be implemented by the autonomous distress tracking (ADT) device 200 of FIGS. 2A-2C for example. FIG. 3 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (302), a state of an aerial vehicle can be determined. For example, an ADT control system 206 of an ADT device 230 can determine a state of an aerial vehicle. By way of example, the state of the aerial vehicle can include a normal state, an abnormal state, and a distress state. The use of three states is provided by way of example only. In some examples, two states may be designated while in other examples more than three states may be designated.

The ADT device may determine the state of the aerial vehicle using various techniques. In some examples, a first set of location coordinates can be received by the control system from an avionics system, such as a location system. The first set of location coordinates can include, for example, global positioning system (GPS) coordinates. In a further embodiment, a second set of location coordinates from a secondary location antenna of a secondary location system can be received by the control system. The second set of location coordinates can include, for example, GPS coordinates. The secondary location antenna can include a GPS antenna. The first set of location coordinates can be compared with the second set of location coordinates. For example, the ADT device 230 can compare the first set of location coordinates with the second set of location coordinates. In one example, the determination of the state of the aerial vehicle is based at least in part on the comparison of the first set of location coordinates and the second set of location coordinates.

At (304), the system determines whether the aerial vehicle is in a first operational state. For example, the ADT device 230 can determine if the aerial vehicle is in a normal state. If the aerial vehicle is in the first operational state, the ADT device transmits first data at (306). The first data is transmitted via the first transmitter at a first interval. In one example, the first interval can be 15 minutes, however, any interval may be used. In some implementations, the first data can be transmitted using any datalink protocol for communicating over satellite and/or radio when the aerial vehicle is in the normal state. For example, protocols such as an aircraft communications addressing and reporting system (ACARS) of the aerial vehicle can be used.

If the aerial vehicle is not in the first operational state, the system determines with the aerial vehicle is in the second operational state at (308). For example, the ADT device can determine if the aerial vehicle is in an abnormal or possible distress state. If the aerial vehicle is in an abnormal state, the ADT device transmits second data at (310). The second data is transmitted via the first transmitter at a second interval. For example, the second interval can be one minute, however, any interval less than the first interval can be used.

In example embodiments, the first data and the second data include messages or packets including one or more common fields. For example, the first data can include: a unique identifier associated with the aerial vehicle, location information (such as location coordinates), error/anti-hacking measures (such as hashes and/or cyclic redundancy check (CRC) information), flight information (such as altitude, direction, speed), etc. The second data can include: a unique identifier associated with the aerial vehicle, a unique identifier associated with the aerial vehicle, location information (such as location coordinates), error/anti-hacking measures (such as hashes and/or cyclic redundancy check (CRC) information), flight information (such as altitude, direction, speed), a distress code (a code that indicates the reason for the possible distress signal), etc. In this example, the second data includes an additional field to that of the first data.

If the aerial vehicle is not in the first or second operational state, the system determines whether the aerial vehicle is in a third operational state at (312). For example, the ADT device can determine if the aerial vehicle is in a distress state. If the aerial vehicle is not in the third operational state, the process can return to (302). If the aerial vehicle is in the third operational state, the ADT device transmits third data at (314). The third data is transmitted via the second transmitter at a third interval. For example, the third interval includes a continuous data transmission in one example. However, any interval less than the second interval can be used. Additionally, the second data can be transmitted via the first transmitter at the second interval when the aerial vehicle is in the third operational state in some implementations.

In some examples, the second transmitter can transmit over a frequency band reserved for emergency communications. For instance, 406 MHz, 121.5 MHz, and 243 MHz are examples of frequency bands that are reserved for emergency communications. In various examples, the second transmitter can transmit at a frequency of 406 MHz, 121.5 MHz, and/or 243 MHz. In an embodiment, at least one of the first data, the second data, and the third data can include a unique identifier for the aerial vehicle. In a further embodiment, at least one of the first data, the second data, and the third data can include information in addition to the unique identifier for the aerial vehicle. The third data can include: a country of origin, a unique 15 digit hexadecimal code, an encoded identification (such as an aircraft registration or a 24-bit international civil aviation organization (ICAO) address), GPS coordinates, a field indicating if a 121.5 MHz homing transmitter is available, a unique identifier associated with the aerial vehicle, flight information (such as altitude, direction, speed), etc.

Optionally, the aerial vehicle can include one or more full authority digital engine controls (FADECs). Each of the one or more ADT devices can share a primary power source with an associated FADEC. The one or more ADT devices can include a secondary power source. The secondary power source can be a fuel cell. The one or more ADT devices can draw power from the secondary power source when the associated primary power source is unavailable. The one or more ADT devices can include two or more ADT devices. The two or more ADT devices can be configured to communicate with each other. For instance, the two or more ADT devices can be configured to communicate with each other through the avionic system. As another example, the two or more ADT devices can be configured to communicate with each other via a communication bus in communication with the two or more ADT devices.

As a further example, the two or more ADT devices can be configured to wirelessly communicate with each other via a wireless communication protocol. In an embodiment, the aerial vehicle can be determined to be in a distress state based at least in part on one of the two or more ADT devices switching from drawing power from the primary power source to the secondary power source. In an embodiment, the aerial vehicle can be determined to be in a distress state based at least in part on more than one of the two or more ADT devices switching from drawing power from the primary power source to the secondary power source. In an embodiment, the aerial vehicle can be determined to be in a distress state based at least in part on all of the two or more ADT devices switching from drawing power from the primary power source to the secondary power source.

An ADT control system is provided in accordance with example embodiments of the disclosed technology that is configured to control an ADT device based on the operational state of an aerial vehicle. More particularly, an ADT control system can be configured to determine a state of the aerial vehicle using flight plan data and/or performance data, and to selectively transmit data by the ADT device based on the state. For example, the ADT control system may compare the performance data to the flight plan data to determine whether a deviation from a flight plan has occurred. If a deviation has occurred, the ADT control system may increase a transmission rate of the ADT device. For example, the ADT device may transmit data via a first transmitter at first interval during normal operating conditions. When a deviation is detected, however, the ADT control system may transmit data via the first transmitter at a second, shorter interval. Based on the amount of deviation, the ADT control system may additionally transmit data via a second transmitter of the ADT device.

Figure 4:
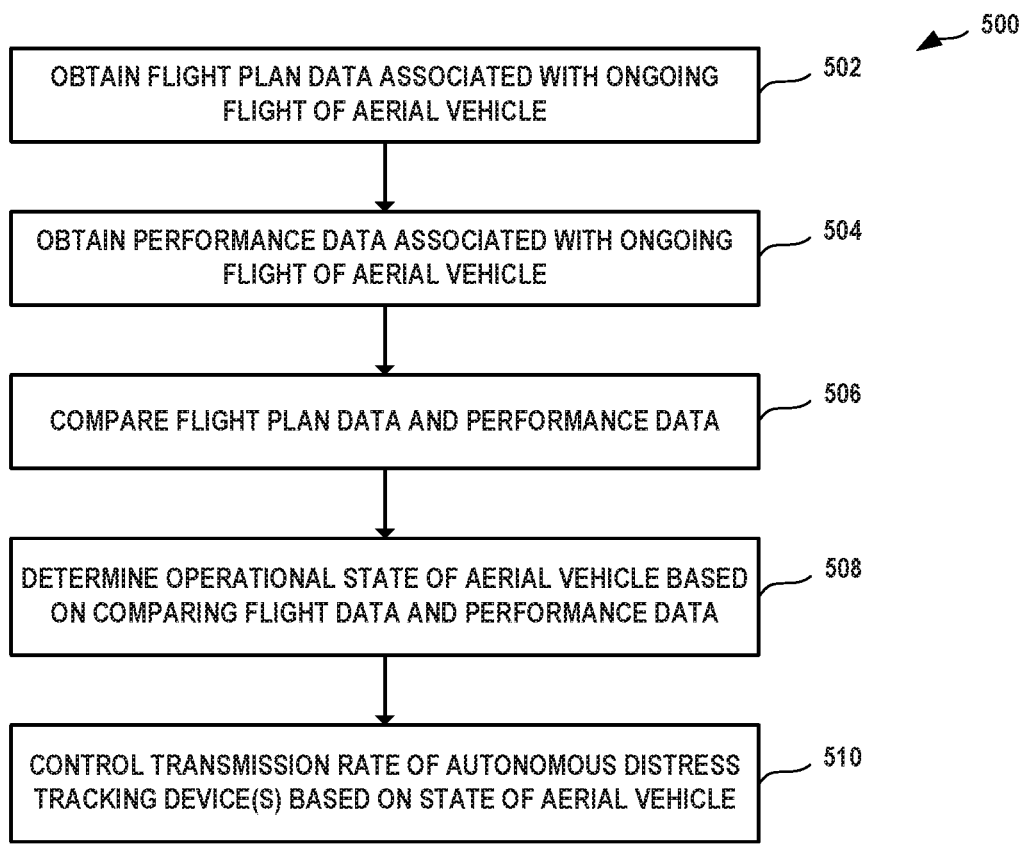
FIG. 4 is a flowchart describing a process of controlling the transmission rate of an ADT device based on the state of an aerial vehicle according to example embodiments of the present disclosure.

FIG. 4 is a flowchart describing a process 500 of controlling the transmission rate of an autonomous distress tracking (ADT) device based on the state of an aerial vehicle in accordance with example embodiments of the disclosed technology. In some implementations, process 500 may be performed by a control system 206 for an ADT device 230. In example embodiments, process 500 may be performed at (302) of FIG. 3. The ADT control system may be integrated within the ADT device or may be separate from the ADT device. In some implementations, process 500 can be performed by one or more processors. However, process 500 may be performed by any suitable combination of hardware, software, and/or firmware.

At (502), flight plan data associated with an ongoing flight of the aerial vehicle is obtained. The flight plan data may be obtained from any suitable local or remote storage location. The flight plan data may include one or more flight plans for the ongoing flight of the aerial vehicle in some implementations. The flight plan data may additionally include alternate routes, arrival times, holding patterns, work checklists, etc.

In some embodiments, an ADT control system may obtain flight plan data from the flight management system of the aerial vehicle. In another example, the ADT control system may obtain the flight plan data from a remote location, such as via a communication signal send to the aerial vehicle. The flight plan data can be stored in a format that can be accessed by one or more processors. The flight plan data can include one or more table(s), function(s), algorithm(s), model(s), equation(s), etc. according to example embodiments of the present disclosure. A data store for the flight plan data may include any suitable data storage technology such as databases, files, data structures and the like configured to store the associated information. In some embodiments, the data store may comprise any combination of one or more of a hard disk drive, RAM (random access memory), ROM (read only memory), flash memory, etc. A data store may store information that is accessed by the ADT control system, and/or data generated by the ADT control system.

At (504), performance data associated with the aerial vehicle during the ongoing flight is obtained. In some implementations, the performance data includes one or more parameters related to the engines 12, aerial vehicle 10, and/or atmosphere external to the aerial vehicle. In some examples, one or more sensors 14 can communicate one or more detected parameters to the ADT control system. The vehicle parameters may be included directly within the sensor data or may be derived from the sensor data. By way of example, vehicle parameters may include location (e.g., GPS coordinates), speed, vehicle attitude and/or orientation, rate of climb and/or descent, heading direction, various pressures, temperatures, fuel flow rate, and/or any other information pertaining to the aerial vehicle's current operating condition. The performance data may be stored locally using any suitable storage technology as described.

At (506), the flight plan data is compared with the aircraft performance data. In some implementations, the ADT control system compares the flight plan data with the aircraft performance data to detect one or more deviations from the aerial vehicle flight plan. By way of example, the ADT control system may compare the data to detect deviations in flight path, direction, speed, rate of descent and/or ascent, or any other deviations from the flight plan data.

At (508), an operational state of the aerial vehicle is determined based on comparing the flight data and the aircraft performance data. In some implementations, the ADT control system determines the aerial vehicle state based on detected deviations from the flight plan data. In some embodiments, the ADT control system may use one or more threshold criterion to determine the state of the aerial vehicle. For example, the ADT control system may determine that the aerial vehicle is in a first operational state when any deviations are below or do not satisfy one or more threshold criterion. If however, a deviation satisfies one or more threshold criterion ADT control system may determine that the aerial vehicle is in a second operational state. Any number of threshold criteria may be used in conjunction with any number of predetermined operational states. In some examples, an aerial vehicle state may be determined based solely on the performance data. For example, if the performance data alone satisfies one or more threshold criterion indicating distress, the ADT control system may determine that the aerial vehicle is in a distress state.

At (510), the transmission rate of the autonomous distress tracking device is controlled based on the determined operational state of the aerial vehicle. For example, the ADT control system may transmit data at a first interval via a first transmitter of the ADT device when the aerial vehicle is in a first operational state. The first transmitter may be configured to transmit data using one or more first predetermined frequency bands. The ADT control system may transmit data at a second interval via the first transmitter when the aerial vehicle is in a second operational state. In various examples, the second operational state may be less secure or stable than the first operational state, and the second interval may be less than the first interval such the data is transmitted more often in the second operational state. The ADT control system may transmit data at a third interval via the second transmitter of the ADT device with the aerial vehicle is in the third operational state. The ADT control system may activate the second transmitter based on determining that the aerial vehicle is in the third operational state. The third operational state may be less secure or stable and the second operational state, and the third interval may be less than the first interval. In some implementations, the ADT control system may also transmit data at the second interval via the first transmitter when the aerial vehicle is in the third operational state. By way of example, the first operational state may be a normal operational state, the second operational state may be an abnormal operational state, and the third operational state may be a distress operational state.

Figure 5:
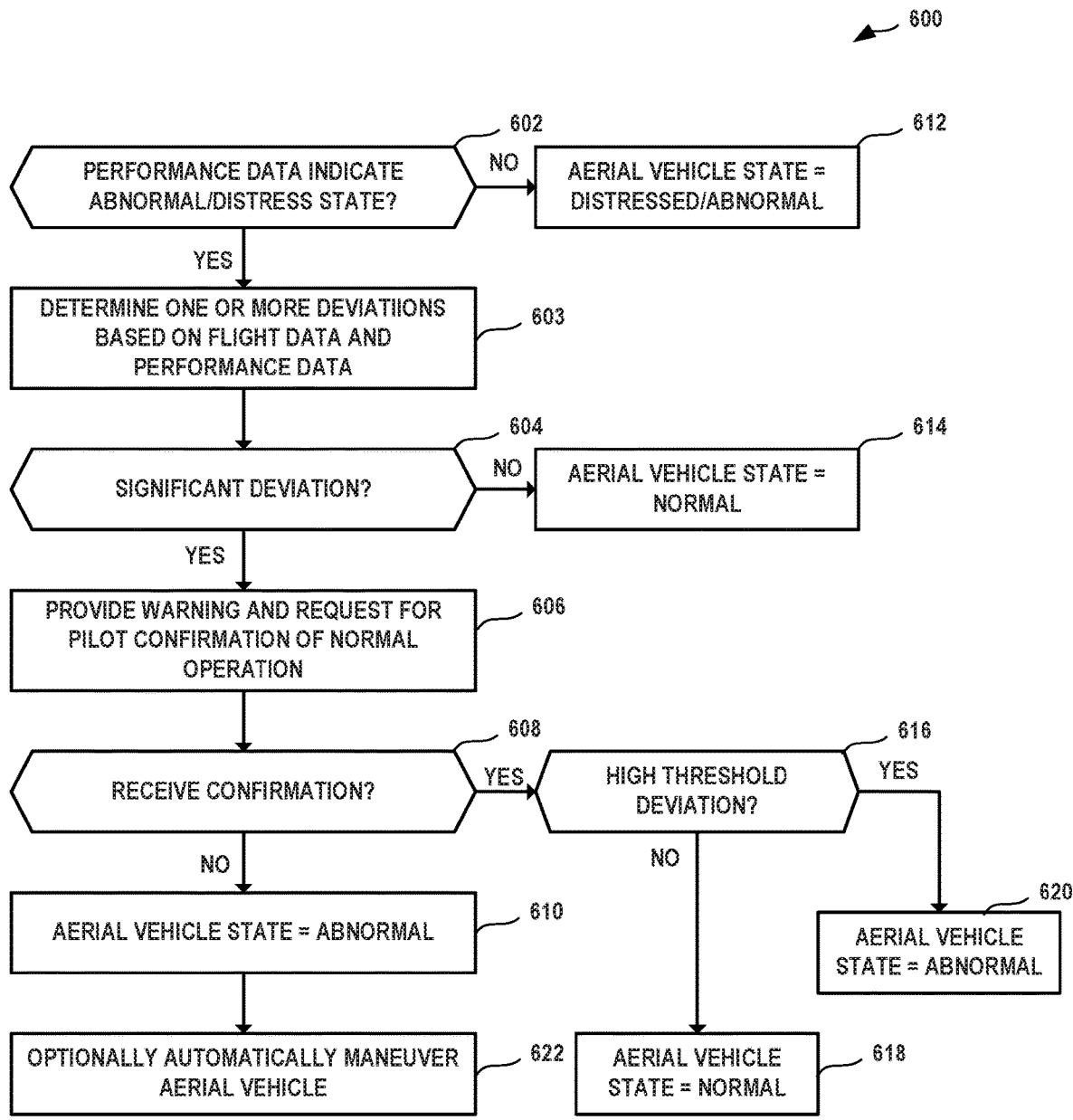
FIG. 5 is a flowchart describing a process of determining the state of an aerial vehicle according to example embodiments of the present disclosure.

FIG. 5 is a flowchart describing a process 600 of determining the operational state of aerial vehicle in accordance with example embodiments of the disclosed technology. In some examples, process 600 can be performed at (508) of FIG. 4. In some implementations, process 600 can be performed by the ADT control system.

At (602), the aircraft performance data is analyzed to determine whether an abnormal or distress state exists. For example, the aircraft performance data can be analyzed to determine if it satisfies one or more performance thresholds. In one example, the one or more performance thresholds define a set of minimum safe operating conditions. If the performance data meets or exceeds the one or more performance thresholds, the system may determine that the aerial vehicle performance meets the minimum safe operating conditions.

In one example, (602) may include monitoring vibration related to the aerial vehicle. For example, sensor data including vibration measurements may be received and used to detect a sharp pulse or some other characteristic of an impact or other engine-related events (e.g., fan blade off). Continued increased vibration may indicative of other propulsion related events (e.g., low oil pressure in engine, autorotation, engine shutdown, engine imbalance). As further example, any signals or warning messages that trigger mandatory reporting, such as to authorities, may be used to determine whether an abnormal or distress state exists. Examples of signals that can be used to trigger an abnormal or distress state may include a traffic advisory from a traffic collision avoidance system (TCAS), an enhanced ground proximity warning system (EGPWS) warning, a fire warning from engine, cabin, or cargo, a stall warning, or an overspeed warning.

If the performance data indicates an abnormal or distress state, such as by failing to satisfy the one or more thresholds, the system may determine that the aerial vehicle is in a distress state or abnormal state at (612). Block 612 is one example of determining an aerial vehicle state based on performance data alone. In some examples, (602) may include using multiple performance threshold levels. If the performance data fails to satisfy one or more higher level performance thresholds, the aerial vehicle may be determined to be in an abnormal state. The higher level performance threshold may include higher minimum operating conditions. If the performance data does not meet the higher minimum operating conditions, it may be in an abnormal state. One or more lower level performance thresholds may be used. The lower level performance threshold may include lower minimum operating conditions. If the performance data fails to satisfy a lower level performance threshold, the aerial vehicle may be determined to be in a distressed state.

In some implementations, the aerial vehicle initially may be determined to be in an abnormal state based on the failure to meet one or more thresholds at (602). A warning for pilot confirmation of the abnormal condition may be provided. If the pilot does not provide confirmation, the aerial vehicle may then be determined to be in a distress state.

If the performance data satisfies the one or more performance thresholds, process 600 continues at (603). At (603), one or more deviations between the flight plan data and the performance data are determined. For example, the ADT control system may determine that a current trajectory based on the performance data includes a deviation from the planned trajectory based on the flight plan data. As another example, the ADT control system may determine whether the aerial vehicle speed or rate of descent/ascent has deviated from the flight plan.

At (604), it is determined whether a detected deviation is significant. In some implementations, one or more threshold criterion may be used at (604). The threshold criteria may be used to detect significant deviations, such as a departure from an assigned flight level or offset outside of Required Navigation Performance (RNP) tolerances or Strategic Lateral Offset Procedures, etc. The threshold criteria may be used to detect unexpected performances such as too high a rate of climb/sink, attitude, altitude, accelerations, ground proximity, unusual maneuvers, unusual command inputs, and the like.

If an actionable deviation is not detected, process 600 continues at (614). At (614), the system may determine that the aerial vehicle is in a normal operational state. If, however, an actionable deviation is detected, process 600 continues at (606). The ADT control system provides a warning and a request for pilot confirmation of normal operation at (606). In some implementations, the ADT control system may generate one or more signals transmitting a user interface or other visual and/or audible notification to a pilot or other operator of the aerial vehicle at (606). For example, ADT control system may generate a warning and request for pilot confirmation via display device 25.

At (608), the system determines whether pilot confirmation of a normal operating condition was received. For example, the system may receive a response via a user interface provided on display 25 in one example. Any suitable reply confirmation may be used. For example, the system may be configured to receive signals transmitting user input received via any suitable user interface. In various examples, a pilot confirmation of a normal, abnormal, distress, or other operating condition may be received.

If pilot confirmation of normal operation is not received, process 600 continues at (610). At (610), the system may determine that the aerial vehicle is in an abnormal operational state. In some implementations, (608) may include receiving pilot confirmation that an abnormal condition exists. In response to a pilot confirmation of an abnormal condition, the system determines that the aerial vehicle state is abnormal at (610). In some implementations, the aerial vehicle may be determined to be in an abnormal state based on the significant deviation. The request for pilot confirmation can be provided. If no response to the request is received, the aerial vehicle may be determined to be in a distress state.

After determining that the aerial vehicle state is abnormal, process 600 can continue at (622), which is optional. The system may automatically maneuver the aerial vehicle at (622). For example, if a loss of cabin pressure signal is received, indicating a significant deviation from the flight plan, and no pilot confirmation is received, the aerial vehicle may be automatically flown and landed. In some implementations, if no pilot confirmation is received and the pilot is already intervening (e.g., by putting the aerial vehicle into rapid descent after loss of cabin pressure), the vehicle can be automatically flown and landed.

If pilot confirmation of normal operation is received, process 600 continues at (616). At (616), it is determined whether the deviation is a high threshold deviation. For example, the system may determine whether the deviation satisfies a high level threshold indicating a large deviation from the flight plan. If the deviation is not a high threshold deviation, process 600 continues at (618) where the aerial vehicle state is determined to be normal.

If the deviation satisfies the high level threshold, however, process 600 continues at (620). Because certain deviations may be considered abnormal even with pilot confirmation, the aerial vehicle state is determined to be abnormal at (620). For example, the ADT device in some embodiments is configured so that it is not possible for unauthorized persons onboard the aerial vehicle to override, shutdown, or otherwise manipulate the ADT device. In this manner, a bad actor can't make the aircraft become unlocatable. Accordingly, (620) permits the ADT device to detect certain deviations from the flight plan and begin transmitting at a shorter interval even if input is received indicating that the deviation is normal. In order to reduce false indications of abnormal states (e.g., changing course before updating the flight plan), a configurable grace period can be provided before triggering a deviation as abnormal.

As shown in FIG. 5, process 600 includes a technique whereby the vehicle state is determined to be normal based on a pilot confirmation. In other examples, a request for pilot confirmation is not provided. For example, in response to any actionable deviation in trajectory a warning can be provided that the aerial vehicle state is determined to be abnormal. An increased transmission rate can be instigated in response to any actionable deviation. In some implementations, an increased transmission rate can be instigated in response to deviations that satisfy a first set of one or more threshold criterion, without providing for pilot confirmation. For deviations that do not satisfy the first set of one or more threshold criterion but that do satisfy a second set of one or more threshold criterion, the system may provide for pilot confirmation prior to instigating an increased transmission rate.

Figure 6:
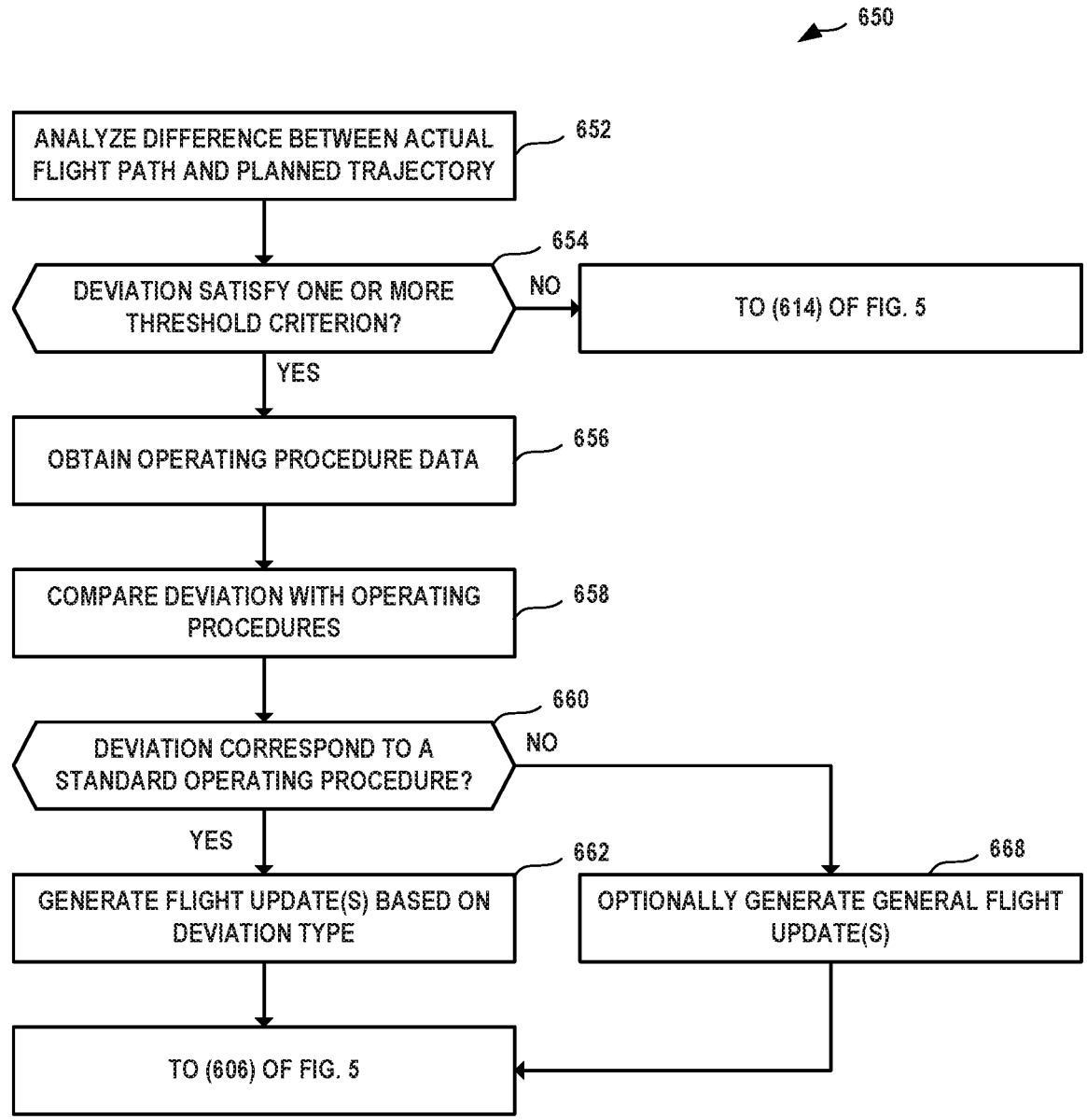
FIG. 6 is a flowchart describing a process of determining a deviation of an aerial vehicle from flight plan data according to example embodiments of the present disclosure.

FIG. 6 is a flowchart depicting a process 650 of determining whether an deviation from a flight plan of the aerial vehicle is significant, and thus actionable by the control system. Process 650 is one example of determining whether an deviation is significant, as can be performed at (604) of FIG. 5. In some implementations, process 600 can be performed by the ADT control system 200.

At (652), a difference is determined between an actual flight path of the aerial vehicle and a planned trajectory of the aerial vehicle. For example, the actual flight path may be determined from performance data and the planned trajectory may be determined from the flight plan data. At (652), the ADT control system may determine an amount of deviation between the actual flight path and the planned trajectory. Although FIG. 6 describes an example of comparing an actual flight path with a planned trajectory, any number and type of deviations may be analyzed at (652). For example, the difference between speeds, headings, and any other type of performance data may be used.

At (654), the system determines whether the deviation from (652) satisfies one or more threshold criterion. In example embodiments, (654) may include determining whether the deviation satisfies one or more threshold deviations. Some amount of deviation may be tolerated. For example, deviations within RNP/SLOP, or other operating characteristics may not be considered significant. Accordingly, various threshold criteria may be used at (654). For example, an amount of deviation may be compared with one or more threshold deviation levels to determine whether an actionable deviation has occurred. The criterion may include threshold distances, speeds, or other threshold parameters. In one example, determining whether a deviation satisfies a threshold criterion includes determining whether the deviation is actionable. The use of thresholds enables the system to selectively alter transmissions based on some deviations, but not others. In this manner, the system may accommodate deviations that are within operating tolerances.

If the system determines that the deviation is not significant, process 650 continues at (614) of FIG. 5. The aircraft operational state may be determined to be normal. If, however, the deviation is determined to be significant, process 650 continues at (656). At (656), the system accesses a database or other data store of standard operating procedure data associated with the aerial vehicle. The standard operating procedure data may define procedures associated with various vehicle events. For example the standard operating procedures may include actions to take in the event of a loss of cabin pressure. In another example, standard operating procedures may define alternate routes or maneuvers to perform in the event of a neighboring aircraft warning for example. In yet another example, standard operating procedures may define alternate routes or lanes to perform in the event of a loss radio communication. Any number and type of standard operating procedures may be defined and stored in accordance with embodiments of the disclosed technology.

At (658), the deviation is compared with the standard operating procedure data. At (660), it is determined whether the deviation corresponds to any of the standard operating procedures. The ADT control system may detect a correspondence between the deviation and the operating procedure data. For example, the ADT control system may determine whether a deviation in trajectory corresponds to a trajectory defined by a standard operating procedure. In another example, the ADT control system may determine whether a sudden and rapid descent corresponds to a flight procedure for a loss of cabin pressure. Generally at (660), the ADT control system attempts to determine whether a deviation may be consistent with a normal or standard operating procedure.

If the deviation matches a standard operating procedure, process 650 proceeds to (662). At (662), a flight plan update is generated based on the type of deviation detected at (660). The flight plan update may include an updated flight plan to an alternate airport or other landing location with a shortest route/shortest time in response to an emergency condition. Other flight plan updates may include updated speeds, arrival times, holding patterns for fuel dumps, and/or work checklists. Generally at (662), the ADT control system attempts to assist the pilot or other vehicle operator with functions based on the type of deviation detected. In this manner, the ADT control system can attempt to offload pilot workload in the event of an abnormal operational state. The flight plan updates can be generated based on a particular deviation type in order to tailor the information to that most suited for the particular event. After generating the flight plan updates, process 650 proceeds to (606) of FIG. 5. In some implementations the flight plan updates from (662) can be provided as part of the warning and/or request at (606). For example, the ADT control system may transmit a notification signal including the flight plan update. The notification signal may include a display notification. The display notification may be transmitted to one or more displays 25 to provide a display of the flight plan update(s) to the pilot.

If the deviation does not match a standard operating procedure, process 650 proceeds to (668). At (668), general flight plan updates can optionally be generated based on a deviation that does not match one of the standard operation procedures. In some implementations, process 650 continues directly to (664) without generating general flight plan updates.

Figure 7:
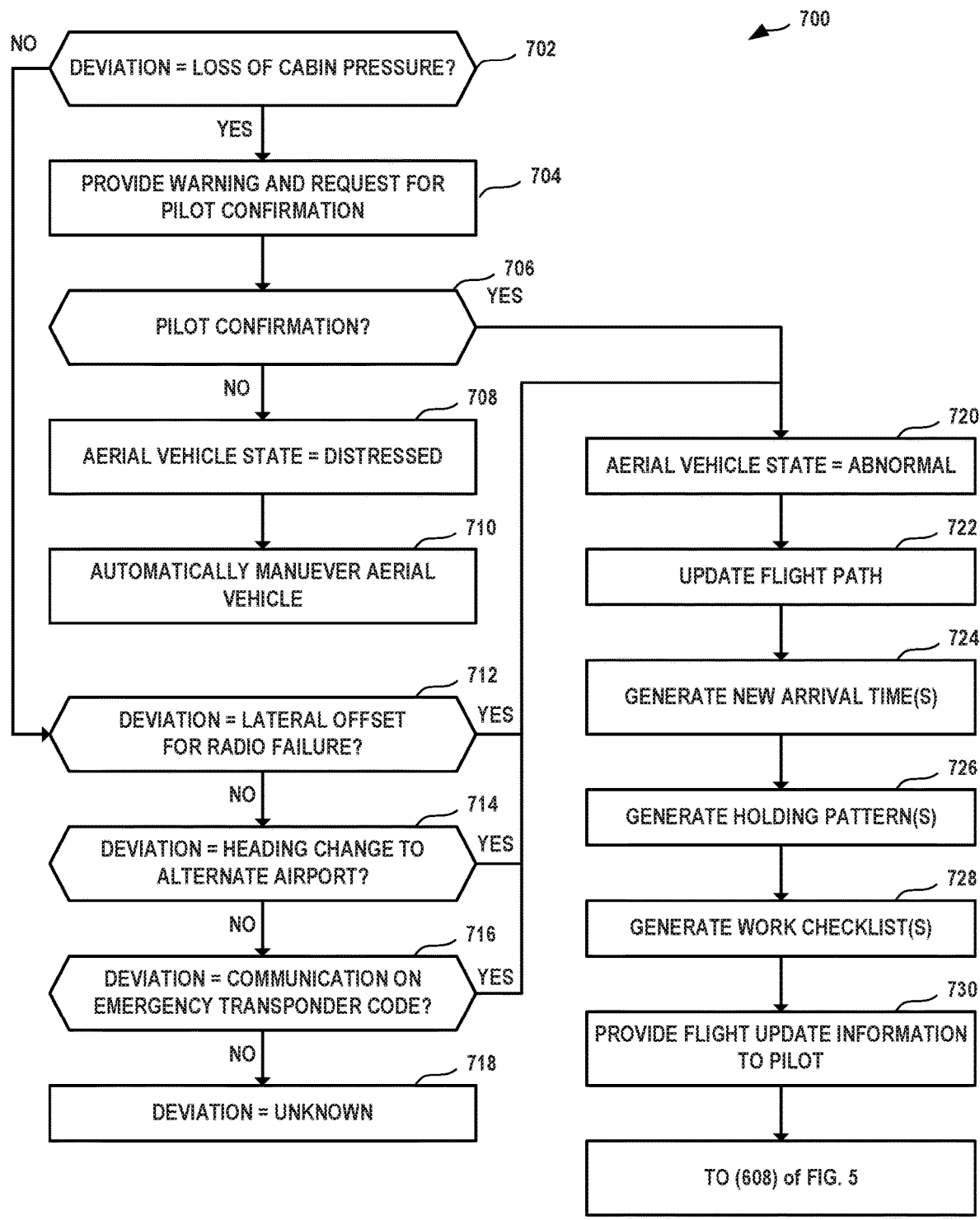
FIG. 7 is a flowchart describing a process of generating flight plan updates based on detected deviations from flight plan data according to example embodiments of the present disclosure.

FIG. 7 is a flowchart describing a process 700 of generating flight plan updates based on one or more detected deviations from flight plan data in accordance with example embodiments of the disclosed technology. Process 700 is one example of generating flight plan updates as can be performed at (662) and/or (668) of process 650. In example embodiments, process 700 may be performed by an ADT control system 200.

At (702), it is determined whether a loss of cabin pressure signal is received. In some implementations, (702) may include determining from performance data whether there has been a loss of cabin pressure.

If the deviation is consistent with a loss of cabin pressure operating procedure, a warning and request for pilot confirmation can be provided at (704). At (706), it is determined whether a pilot confirmation indicating a loss of cabin pressure is received. If a pilot confirmation is received at (706), process 700 proceeds to (720). In this example, the ADT control system determines at (720) that the aerial vehicle is in an abnormal operational state. Based on the pilot confirmation of a loss of cabin pressure, the ADT control system determines that the aerial vehicle is an abnormal operational state at (720). In another example, the ADT control system may determine that the aerial vehicle is in a normal operational state at (720) if the pilot indicates that a deviation was intentionally caused.

At (722)-(728), an updated flight plan can be generated to assist a pilot or other vehicle operator based on the abnormal operational state. At (722), an updated flight path can be generated. For example, a flight path to a nearest available airport for landing may be automatically generated. In other examples, an alternate flight path to the original destination may be automatically generated based on the type of deviation. At (724), one or more new arrival times can be generated for the updated flight path. At (726), one or more holding patterns may be generated. Block 726 is optional and may be performed in response to particular deviations. For example, a holding pattern for a fuel dump may be generated in response to some deviations. A holding pattern to await a landing may be generated in response to other deviations. At (728) one or more work checklists can be generated. For example, in response to loss of cabin pressure a checklist of operations to be performed by a pilot can be generated automatically.

At (730), the updated flight plan can be provided to the pilot or other vehicle operator. In some implementations, the ADT control system can generate one or more signals causing the updated flight plan to be displayed by displays 25. The ADT control system can generate other signals, such as audible or other visual transmissions. After providing the updated flight plan, process 700 continues at (608) of FIG. 5. If a pilot confirmation is later received, the aerial vehicle operational state may be set from abnormal to normal.

If a pilot confirmation is not received at (706), the aerial vehicle is determined to be in a distressed state at (708). At (710), the aerial vehicle can be automatically maneuvered based on the lack of pilot response and the indication of a loss of cabin pressure. In some examples, if the pilot is already intervening (e.g., by placing the aerial vehicle into a rapid descent) but does not acknowledge the warning, the aerial vehicle may be automatically maneuvered. In some implementations, (710) may include automatically landing the aerial vehicle. For example, the ADT control system can issue one or more commands to the flight management system to engage autopilot. In some examples, the ADT control system can determine a closest airport suitable for an automatic landing (e.g., having a CAT3 runway). In other examples, the ADT control system can issue one or more commands to the flight management system to engage autopilot to bring the aerial vehicle to an altitude with sufficient oxygen levels. The system may then await further pilot input.

If the deviation is not consistent with a steep descent for loss of cabin pressure, the process continues at (712). At (712), it is determined whether the deviation is consistent with a lateral offset in the flight path for radio failure. For example, the ADT control system may determine from performance data whether the current path is consistent with a deviation from the planned trajectory as may be performed in response to a standard operating procedure for radio failure. The ADT control system may additionally determine from performance data whether a radio failure has in fact occurred. If the deviation is consistent with a lateral offset for radio failure, process 700 continues at (720) as previously described. The updated flight plan may be generated based on a lateral offset deviation rather than a loss of cabin pressure deviation.

If the deviation is not consistent with a lateral offset for radio failure, process 700 continues at (714). At (714), it is determined whether the deviation is consistent with a heading change to an alternate airport. For example, the ADT control system may determine from performance data whether the current heading is towards an alternate airport to that of the original destination, as may be specified in the flight plan data. If the deviation is consistent with a heading change, process 700 continues at (720) as previously described.

If the deviation is not consistent with a heading change to an alternate airport, the process continues at (716). At (716), it is determined whether the deviation is consistent with communication of an emergency transponder code. For example, the ADT control system may determine in response to a deviation from flight path whether the aerial vehicle is transmitting transponder codes 7500, 7600, or 7700. If the aerial vehicle is transmitting an emergency transponder code, process 700 continues at (720) as previously described.

If the deviation is not consistent with communication of an emergency transponder code, process 700 continues at 718. At (718), it is determined that the type of deviation is unknown. In one example, ADT control system may continue by generating generalized flight plan updates as shown at (668) in FIG. 6. It is noted that the particular procedures in FIG. 7 are provided by way of example only. Any number and type of operating procedure may be compared against a deviation.

Figure 8:
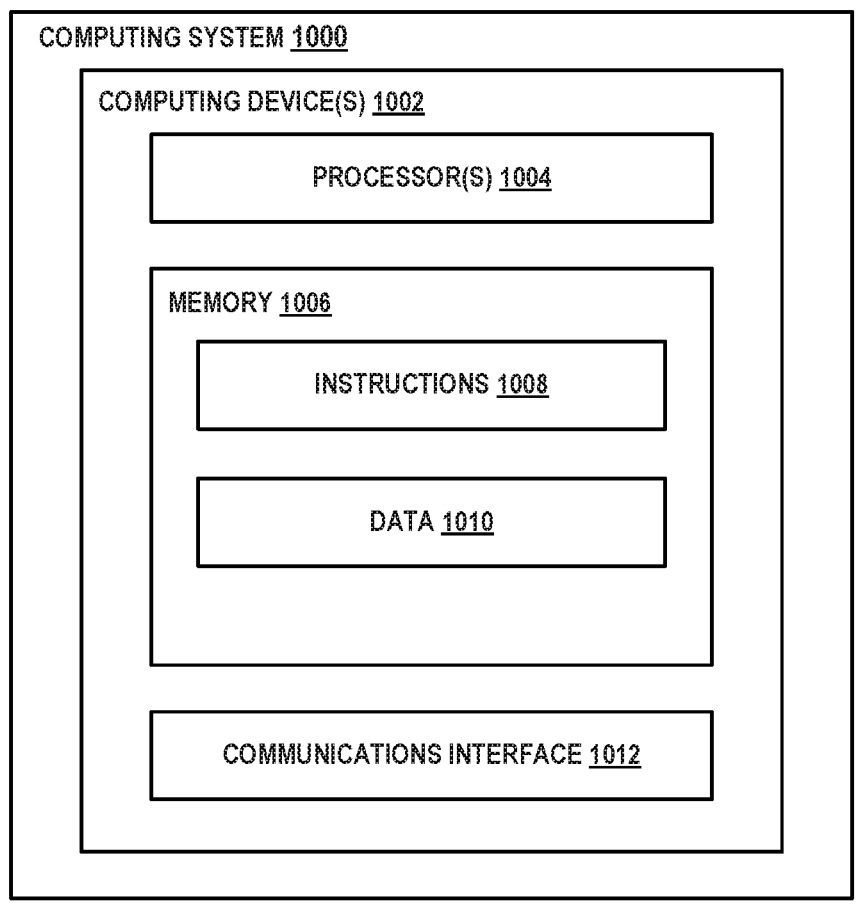
FIG. 8 depicts a block diagram of an example of a computing system.

FIG. 8 depicts a block diagram of an example computing system 1000 that can be used to implement methods and systems according to example embodiments of the present disclosure. Computing system 1000 may be used to implement a ADT control system 206, flight management system 20, vehicle control system 16, etc. as described herein. It will be appreciated, however, that computing system 1000 is one example of a suitable computing system for implementing the control systems and other computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for controlling the transmission rate of an ADT device, and/or any other operations or functions of the one or more computing device(s) 1002.

The memory device(s) 1006 can further store data 1010 that can be accessed by the processors 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aerial vehicle, comprising:
    one or more autonomous distress tracking (ADT) devices, each ADT device including at least one transmitter configured to transmit messages over one or more predetermined frequency bands; and
    a control system configured to control a transmission rate of the one or more ADT devices, the control system configured to:
        obtain flight plan data associated with an ongoing flight of the aerial vehicle;
        determine performance data associated with the aerial vehicle during the ongoing flight, wherein the performance data is collected from one or more sensors on the aerial vehicle;
        compare the flight plan data with the performance data to determine one or more deviations associated with the aerial vehicle; and
        control the transmission rate of the one or more ADT devices based on the one or more deviations.

2. The aerial vehicle of claim 1, wherein the control system is configured to:
    determine whether the one or more deviations satisfy at least one threshold criterion;
    in response to the one or more deviations failing to satisfy the at least one threshold criterion, transmit data at a first interval via the at least one transmitter; and
    in response to the one or more deviations satisfying the at least one threshold criterion, transmit data at a second interval via the at least one transmitter;
    wherein the first interval is longer than the second interval.

3. The aerial vehicle of claim 2, wherein the control system is configured to:
    obtain operating procedure data in response to the one or more deviations satisfying the at least one threshold criterion;
    compare the operating procedure data with the one or more deviations;
    in response to detecting a correspondence between the one or more deviations and the operating procedure data, generate a flight plan update based on the correspondence; and
    generate a notification including the flight plan update.

4. The aerial vehicle of claim 3, wherein the control system is configured to generate the notification including the flight plan update by generating a display notification including the flight plan update.

5. The aerial vehicle of claim 3, wherein the flight plan update includes at least one of an updated flight plan, an updated arrival time, a holding pattern for a fuel dump, or a work checklist.

6. The aerial vehicle of claim 1, further comprising:
    one or more sensors configured to generate sensor data;
    wherein the ADT control system is configured to determine performance data based on the sensor data.

7. The aerial vehicle of claim 1, wherein the control system is configured to:
    in response to the one or more deviations satisfying at least one threshold criterion, transmit a request for pilot confirmation of normal operation;
    in response to receiving pilot confirmation, transmit data at a first interval; and
    in response to not receiving pilot confirmation, transmit data at a second interval;
    wherein the first interval is longer than the second interval.

8. The aerial vehicle of claim 7, wherein:
    the pilot confirmation is a first pilot confirmation confirming normal operation; and the ADT control system is configured to transmit data at the second interval in response to a second pilot confirmation confirming abnormal operation.

9. The aerial vehicle of claim 1, wherein the control system is configured to:
in response to the one or more deviations, transmit a request for pilot confirmation of normal operation; and
in response to not receiving pilot confirmation, automatically maneuver the aerial vehicle.

10. The aerial vehicle of claim 1, wherein:
the at least one transmitter includes a first transmitter and a second transmitter;
the first transmitter is configured to transmit messages over a first frequency band of the one or more predetermined frequency bands;
the second transmitter is configured to transmit messages over a second frequency band of the one or more predetermined frequency bands;
the ADT control system is configured to control the transmission rate of the first transmitter based on the one or more deviations; and
the ADT control system is configured to selectively activate the second transmitter based on the one or more deviations.

11. An autonomous distress tracking (ADT) system, comprising:
a first transmitter configured to transmit messages over one or more predetermined frequency bands;
at least one processor configured to control transmissions by the first transmitter, the at least one processor configured to:
obtain flight plan data associated with an ongoing flight of an aerial vehicle;
determine performance data associated with the aerial vehicle during the ongoing flight, wherein the performance data is collected from one or more sensors on the aerial vehicle;
determine a state of the aerial vehicle based on a comparison of the flight plan data with the performance data;
transmit messages via the first transmitter at a first interval in response to a first state of the aerial vehicle; and
transmit messages via the first transmitter at a second interval in response to a second state of the aerial vehicle, wherein the first interval is longer than the second interval.

12. The ADT system of claim 11, wherein the first transmitter is configured to transmit messages over a first predetermined frequency band of the one or more predetermined frequency bands, the ADT system further comprising:
a second transmitter configured to transmit messages over a second predetermined frequency band of the one or more predetermined frequency bands;
wherein the at least one processor is configured to transmit, in response to a third state of the aerial vehicle, messages via the first transmitter at the second interval and messages via the second transmitter at a third interval, wherein the second interval is longer than the third interval.

13. The ADT system of claim 11, wherein the at least one processor is configured to:
detect a deviation between the flight plan data and the performance data;
obtain operating procedure data in response to detecting the deviation;
compare the operating procedure data with the deviation;
in response to detecting a correspondence between the deviation and the operating procedure data, generate a flight plan update based on the correspondence; and
generate a notification signal including the flight plan update.

14. The ADT system of claim 13, wherein the flight plan update includes at least one of an updated flight plan, an updated arrival time, a holding pattern for a fuel dump, or a work checklist.

15. The ADT system of claim 11, wherein the at least one processor is configured to:
detect a deviation between the flight plan data and the performance data;
generate a request for pilot confirmation in response to detecting the deviation;
automatically maneuver the aerial vehicle in response to a failure to receive pilot confirmation.

16. The ADT system of claim 11, further comprising:
one or more sensors configured to generate sensor data;
wherein the at least one processor is configured to determine performance data based on the sensor data.

17. A computer-implemented method, comprising:
transmitting data via at least one transmitter of a tracking device for an aerial vehicle at a first transmission rate;
obtaining flight plan data associated with an ongoing flight of the aerial vehicle;
determining performance data associated with the aerial vehicle during the ongoing flight, wherein the performance data is collected from one or more sensors on the aerial vehicle;
detecting one or more deviations based on comparing the flight plan data with the performance data; and
transmitting data via the at least one transmitter at a second transmission rate in response to detecting the one or more deviations, wherein the first transmission rate is slower than the second transmission rate.

18. The computer-implemented method of claim 17, further comprising:
obtaining operating procedure data in response to detecting the one or more deviations;
comparing the operating procedure data with the one or more deviations;
in response to detecting a correspondence between the one or more deviations and the operating procedure data, generate a flight plan update based on the correspondence; and
generate a notification signal including the flight plan update.

19. The computer-implemented method of claim 18, wherein the flight plan update includes at least one of an updated flight plan, an updated arrival time, a holding pattern for a fuel dump, or a work checklist.

20. The computer-implemented method of claim 18, wherein:
the at least transmitter includes a first transmitter and a second transmitter;
the first transmitter is configured to transmit data over a first predetermined frequency band;
the second transmitter is configured to transmit data over a second predetermined frequency band;
the method further comprises, in response to a first deviation, transmitting data via the first transmitter at the second transmission rate;
the method further comprises, in response to a second deviation, transmitting data via the first transmitter at the second transmission rate and transmitting data via the second transmitter at a third transmission rate; and the second transmission rate is slower than the third transmission rate.

* * * * *